Sept. 18, 1923.
M. GREEN
ANTISKID DEVICE
Filed April 18, 1922
1,468,382
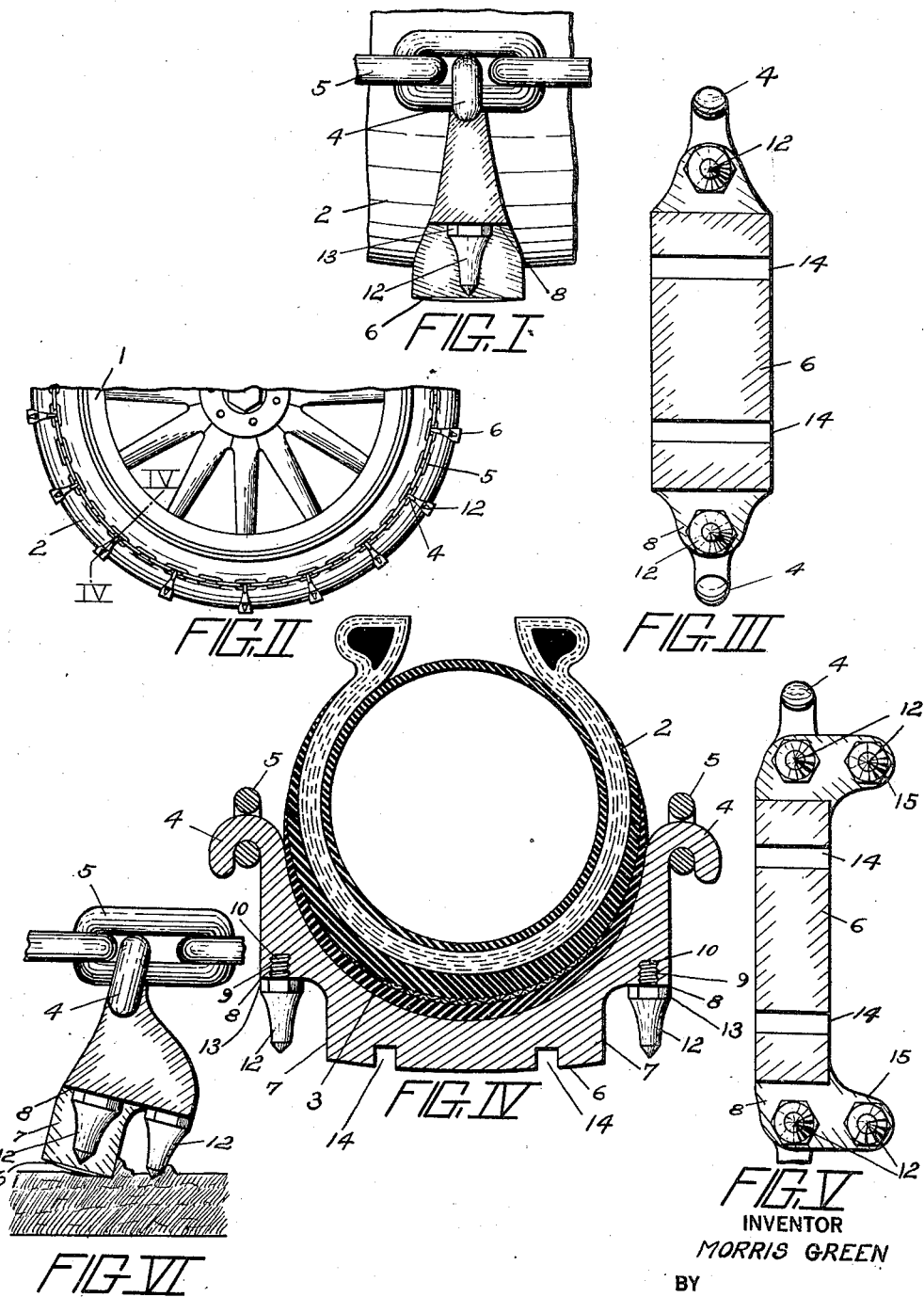
INVENTOR
MORRIS GREEN
BY
A. H. Parsons
ATTORNEY Patented Sept. 18, 1923.

1,468,382

UNITED STATES PATENT OFFICE.

MORRIS GREEN, OF SOUTHBRIDGE, MASSACHUSETTS.

ANTISKID DEVICE.

Application filed April 18, 1922. Serial No. 554,772.

*To all whom it may concern:*

Be it known that I, MORRIS GREEN, a citizen of the United States, residing at Southbridge, in the county of Worcester and State of Massachusetts, have invented certain new and useful Improvements in Antiskid Devices, of which the following is a specification.

This invention relates to improvements in anti-skid devices, and has particular reference to a novel and improved form of device for application to automobile tires or the like for the prevention of skids, sideslipping or the like.

One of the principal objects of the present invention is the provision of a device of this character which shall be provided with renewable or replaceable gripping members of a character which can be easily secured throughout the country and the structure thus readily kept in a condition of maximum efficiency.

A further object of the present invention is the provision of a device in which the main gripping or anti-skid portions shall be normally protected from contact with the road, thus both prolonging the life of said devices and also making it possible to employ sharp and positive gripping means which will have no deleterious effect on the permanent road construction while firmly engaging any snow, ice or mud covering thereof.

Another object of the present invention is the provision of a device of this character in which the normal direction of pressure on the gripping means is in a direction to press them more firmly against their support or backing member and prevent them from being bent out of operative position or readily broken off.

Another object of the invention is the provision of a device for preventing or stopping skidding or for use as a mud hook as may be desired which shall be so formed and constructed that while normally holding the sharp gripping members out of contact with a hard surfaced road it will automatically shift said members into operative position in the event of side-wise movement of the tire to which it is applied or forward sliding of a locked wheel or the like bearing the device.

Other objects and advantages of my improvement should be readily apparent by reference to the following specification taken in connection with the accompanying drawings forming a part thereof, and it will be understood that I may make any modifications in the specific details of construction shown and described within the scope of the appended claims without departing from or exceeding the spirit of my invention.

Figure I represents an elevation of one of my improved anti-skid devices.

Figure II represents a fragmentary view of an automobile tire having my invention applied thereto.

Figure III represents a plan view thereof.

Figure IV represents a cross-sectional view taken as on the line IV—IV of Figure II.

Figure V represents a plan view of a slightly modified form of the invention, and Figure VI represents a side elevation illustrating the operation of this form of the invention.

In the drawing, in which similar characters of reference are employed to denote corresponding parts throughout the several views, the numeral 1 designates an automobile or other vehicle wheel having thereon the tire 2 to which my invention is applied.

This invention, as is clearly illustrated, comprises a series of similar metal plate members having their inner faces as at 3 shaped to fit the tire 2 and having the hooks or other attaching means 4 to which are secured the chains or connections 5 which serve to join together the several plate members in a band surrounding the tire much in the manner of the ordinary and well known anti-skid chains or the like.

These plate members, however, as will perhaps be best understood by reference to Figure IV comprise a central upwardly projecting and slightly rounded tread portion 6 laterally terminating in the cliffs or shoulders 7 which extend down to the seats 8 which are formed with sockets 9 to receive the threaded tangs 10 of the horse-shoe or calk members 12. These members 12 are formed with the basal shouldered polygonal portions 13 which serve the double purpose of a hold for a wrench in screwing them in place or removing them and also by seating tightly against the seats 8 solidly brace the outer pointed portions thereof resisting lateral bending thereof or the like. It is to be noted that the tread portion of the device is in addition to the shoulders at 7 preferably formed with the transversely extending grooves or channels 14 extending peripherally of the tire when in use.

In operation, the series of devices is applied to a tire in the manner indicated in Figure II, being there secured by the chains 5. In normal running the tread portions 6 will contact with the road, and it is to be particularly noted that while the members 12 are normal to the road so that should the tread 6 sink at all thereinto they would have a direct biting action as the wheel rotates, at the same time the height of the tread and its width are such that the points lie just therebelow and out of contact with a hard road surface, at the one time preventing damage to the road by the points and also preventing the points from wearing out under ordinary service conditions. When, however, there is a side-wise sliding strain on the member 6, the shoulder as at 7 and the shoulders or edges of the grooves 14 will sufficiently catch on the road to increase the tilting tendency of the device so that it will rock an amount sufficient to bring the points 12 into biting engagement with the road, thus pulling the adjacent members slightly sideways so that there is a rotating series of spikes biting in to prevent the lateral skid, in addition to the resistance of the shoulders at 7 and 14. As the skid stops, the normal bearing on the tread 6 will be resumed.

In Figures V and VI I have illustrated another form or modification of the invention possessing all the features just described with the addition that supplemental laterally offset seats 15 are formed in place of or in addition to the seats 8, these seats being also provided with the calks or points 12.

In the operation of this form of the invention, the offset seats are preferably so placed as to be forwardly of the tread portion 6 as the latter is resting on the ground, with the result that as long as the wheels are exerting a forward driving action the catching of the rear edge of the tread against the road will tend to tilt the plate and lift the points away from the road on account of their eccentric or off-center position. On the other hand, as when the car is going down hill and the brakes are acting to lock the wheels, the forward sliding action will cause the front edges of the tread plates to catch against the road, tilting the same and projecting the points into gripping or biting engagement with the road surface to prevent forward skidding or sliding of the machine.

From the foregoing description taken in connection with the drawings the construction and operation of my improved anti-skidding device should be readily understood, and it will be seen that I have produced a new and novel device embodying in both forms shown gripping points which are replaceable and which are so disposed as to be normally out of contact with the road surface but in which the portion in contact with the road is so formed as to automatically shift the points into operative position when the same are required, and in which in addition the points are always operatively disposed when the wheel equipped therewith is travelling on mud or other soft going.

I claim:

1. A device of the character described comprising a plate adapted to fit transversely of a tire and having grooves formed transversely of its face to provide road engaging shoulders to prevent lateral slipping of the plate, said plate being further formed at its sides with depressed seats, and gripping members projecting from the seats to engage the road as the plate is tilted by biting of the shoulders thereinto on lateral slipping.

2. In a device of the character described, the combination with a body portion having a road engaging section and relatively depressed seats, of supplemental gripping members carried by the seats, certain of said members being disposed in substantial alignment with the body portion and other of said members being laterally offset with respect thereto, substantially as and for the purpose described.

MORRIS GREEN.